United States Patent [19]

Kushner et al.

[11] Patent Number: 5,617,509
[45] Date of Patent: Apr. 1, 1997

[54] METHOD, APPARATUS, AND RADIO OPTIMIZING HIDDEN MARKOV MODEL SPEECH RECOGNITION

[75] Inventors: William M. Kushner, Arlington Heights; Edward Srenger, Schaumburg; Matthew A. Hartman, Bloomington, all of Ill.

[73] Assignee: Motorola, Inc., Schaumburg, Ill.

[21] Appl. No.: 413,146

[22] Filed: Mar. 29, 1995

[51] Int. Cl.$^6$ ........................................... G10L 9/00
[52] U.S. Cl. .................... 395/2.65; 395/2.6; 395/2.64
[58] Field of Search ..................... 395/2, 2.1, 2.4, 395/2.6, 2.64, 2.65, 2.66, 2.09; 381/41, 43

[56] References Cited

U.S. PATENT DOCUMENTS

| | | | |
|---|---|---|---|
| 4,348,553 | 9/1982 | Baker et al. | 395/2.65 |
| 5,440,662 | 8/1995 | Sukkar | 395/2.65 |

OTHER PUBLICATIONS

G. David Foney, Jr. "The Viterbi Algorithm", Proc. IEEE, vol. 61, No. 3, Mar. 1973 pp. 268–278.
John S. Bridle, Michael D. Brown, and Richard M. Chamberlain "An Algorithm for Connected Word Recognition," ICASSP '82 pp. 899–902, May 1982.
Lawrence R. Rabiner, "A Tutorial on Hidden Markov Models and Selected Applications in Speech Recognition," Proc. IEEE, vol. 77, No. 2 Feb., 1989, pp. 257–286.

*Primary Examiner*—Allen R. MacDonald
*Assistant Examiner*—Michael A. Sartori
*Attorney, Agent, or Firm*—Darleen J. Stockley

[57] ABSTRACT

In a statistical based speech recognition system, one of the key issues is the selection of the Hidden Markov Model that best matches a given sequence of feature observations. The problem is usually addressed by the calculation of the maximum likelihood, ML, state sequence by means of a Viterbi or other decoder. Noise or inadequate training can produce a ML sequence associated with a Hidden Markov Model other than the correct model. The method of the present invention provides improved robustness by combining the standard ML state sequence score (416) with an additional path score (418) derived from the dynamics of the ML score as a function of time. These two scores, when combined, form a hybrid metric (420) that, when used with the decoder, optimizes selection of the correct Hidden Markov Model (422).

9 Claims, 8 Drawing Sheets

400

406

METHOD, APPARATUS, AND RADIO OPTIMIZING HIDDEN MARKOV MODEL SPEECH RECOGNITION

FIELD OF THE INVENTION

The present invention relates generally to speech recognition, and more particularly to speech recognition using Hidden Markov Models.

BACKGROUND OF THE INVENTION

Hidden Markov Model, HMM, speech recognition systems determine which previously trained, stored model best matches the string of input feature observations characterizing a given input speech utterance.

Prior art HMM speech recognition systems choose a model based on a best state sequence, in the maximum likelihood sense, at a specified time. Noise or inadequate training can cause a maximum likelihood state sequence associated with a model other than the correct model to be chosen.

Accordingly, there is a need for a method, apparatus, and radio for Hidden Markov Model speech recognition that optimizes the model selection especially in the presence of noise or inadequate training.

DETAILED DESCRIPTION OF A PREFERRED EMBODIMENT

Figure 1:
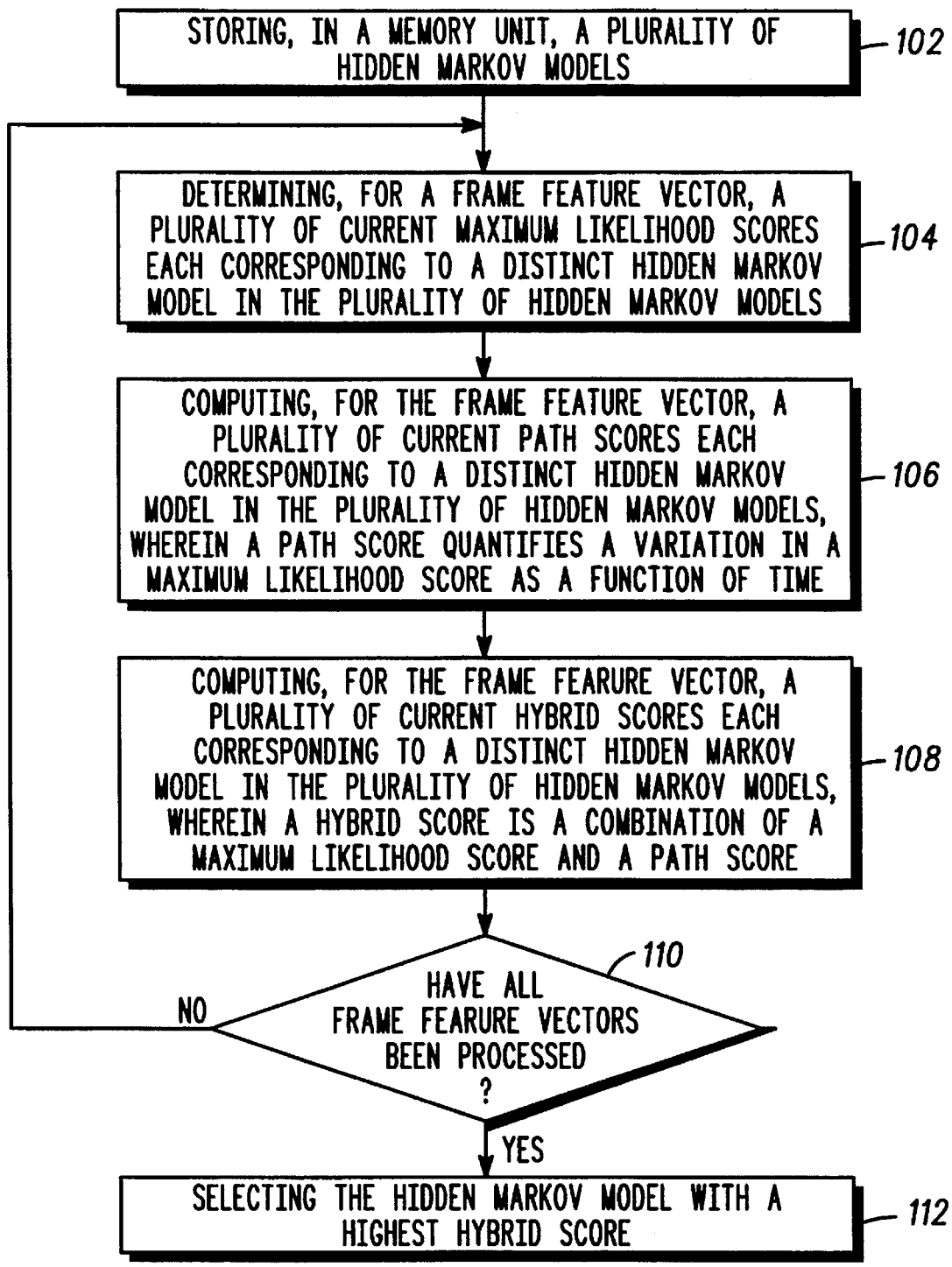
FIG. 1 is a flow diagram of one embodiment of steps for a method for optimizing Hidden Markov Model speech recognition in accordance with the present invention.

Generally, the present invention provides a method, apparatus, and radio for Hidden Markov Model speech recognition that optimizes the model selection, in particular in the presence of noise or inadequate training. The advantage of using the ML-PATH metric is that the overall performance of a speech recognizer is significantly improved over that obtained with standard ML metric, especially under noisy conditions. Before describing the embodiments of this invention, the principle of the invention will be explained.

The essence of a Hidden Markov Model, HMM, speech recognition system is the determination of which previously trained, stored model best matches the string of input feature observations characterizing a given input speech utterance. The most common approach used in determining the correct HMM model for a given sequence of feature observations is to select the model with the maximum probabilistic likelihood, ML, expressed as in Equation 1.

$$\text{Mbest} = \text{MAX} \, \{\forall (k \epsilon K_{model}) | \text{prob} \, (M_k | O_t)\}, t=0, 1, 2, \ldots, \text{Tmax} \quad \text{(Eq. 1)}$$

$M_k$ is the kth of K HMM models and $O_t$ is the string of speech feature observations. By using Bayes theorem, this may be expressed as in Equation 2.

$$\text{prob} \, (M_k | O_t) = \text{prob} \, (O_t | M_k) \, \text{prob} \, (M_k) | \text{prob} \, (O_t) \quad \text{(Eq. 2)}$$

Here $\text{prob}(O_t | M_k)$, the probability of observation $O_t$ occurring at time t given model $M_k$, is easily and directly determined for a given observation sequence by means of a Viterbi decoder, the Forward Search algorithm, or other search methods commonly used in HMM-based speech recognition devices as described in "A Tutorial on Hidden Markov Models and Selected Applications in Speech Recognition", Rabiner, L. R., IEEE Proceedings, Vol. 77, No. 2, February 1989, pp. 257–285; "The Viterbi Algorithm", Forney, G. D., IEEE Proceedings, Vol. 61, pp. 268–278, March 1973; and "A One-Pass algorithm for connected word recognition", Bridle, J. S., Brown, R. M., and Chamberlain, R. M., ICASSP '82, pp. 899–902, Paris France, May 1982. $M_k$, the HMM model, is a first order Markov chain consisting of N independent states defined by a set of transition probabilities and observation probabilities. The determination of $$\text{MAX} \, \{prob(M_k | O_t)\} \atop K$$

by a Viterbi or other type decoder is really a determination of the best ML state sequence through each HMM model given a set of input observations. During model training, the model parameters are optimized to produce the best state sequence given known training data rather than to produce the best inter-model discrimination. The ML "best" model decision is usually made at prespecified times in the observation sequence or when the last model state has been occupied for a predetermined amount of time. Noise or inadequate training can produce a maximum likelihood state sequence associated with a model other than the "correct" model, i.e., the model corresponding to the spoken input. This is a problem that the proposed invention mitigates.

The invention described herein is a method implemented in computer hardware that provides an optimized means for choosing the "correct" HMM model for a given speech feature observation sequence. The standard maximum likelihood, ML, is combined with the state sequence score, ML score, and with an additional score, herein called the PATH score, derived from information describing the dynamics of the ML score as a function of time, i.e., its score path. This additional PATH score information is derived from the HMM decoding algorithm and is combined with the ML score information in a novel way to form a hybrid metric, herein called the ML-PATH metric, for choosing the correct HMM model.

One advantage of using the ML-PATH metric is that the overall accuracy of a speech recognizer can be significantly improved over that obtained with the standard ML metric alone, especially under noisy conditions. This has been demonstrated by the inventors through numerous experiments. This invention utilizes information already determined in the normal maximum likelihood (ML) calculations of the recognizer search algorithm to derive new information, i.e., the PATH score, and combine the two in novel ways to derive a new metric, the ML-PATH metric, which more accurately determines the correct HMM for a given spoken input utterance.

FIG. 1, numeral 100, is a flow diagram of one embodiment of steps for a method for optimizing Hidden Markov Model speech recognition in accordance with the present invention. The first step is storing, in a memory unit, a plurality of predetermined Hidden Markov Models (102). A speech utterance is divided into frames corresponding to frame feature vectors. The second step is determining, in a decoder for a frame feature vector, a plurality of current maximum likelihood scores each corresponding to a distinct Hidden Markov Model in the plurality of predetermined Hidden Markov Models (104). Typically maximum likelihood scores are computed by a Viterbi decoder. The third step is computing, in the decoder for the frame feature vector, a plurality of current path scores each corresponding to a distinct Hidden Markov Model in the plurality of predetermined Hidden Markov Models, wherein a path score quantifies a variation in a maximum likelihood score as a function of time (106). The fourth step is computing, in the decoder for the frame feature vector, a plurality of current hybrid scores each corresponding to a distinct Hidden Markov Model in the plurality of predetermined Hidden Markov Models, wherein each hybrid score is a combination of the maximum likelihood score and the path score for each model (108). The fifth step is determining whether all frame feature vectors have been processed and repeating the second, third and fourth steps (110). The final step is selecting a Hidden Markov Model with a lowest or best current hybrid score (112).

Figure 2:
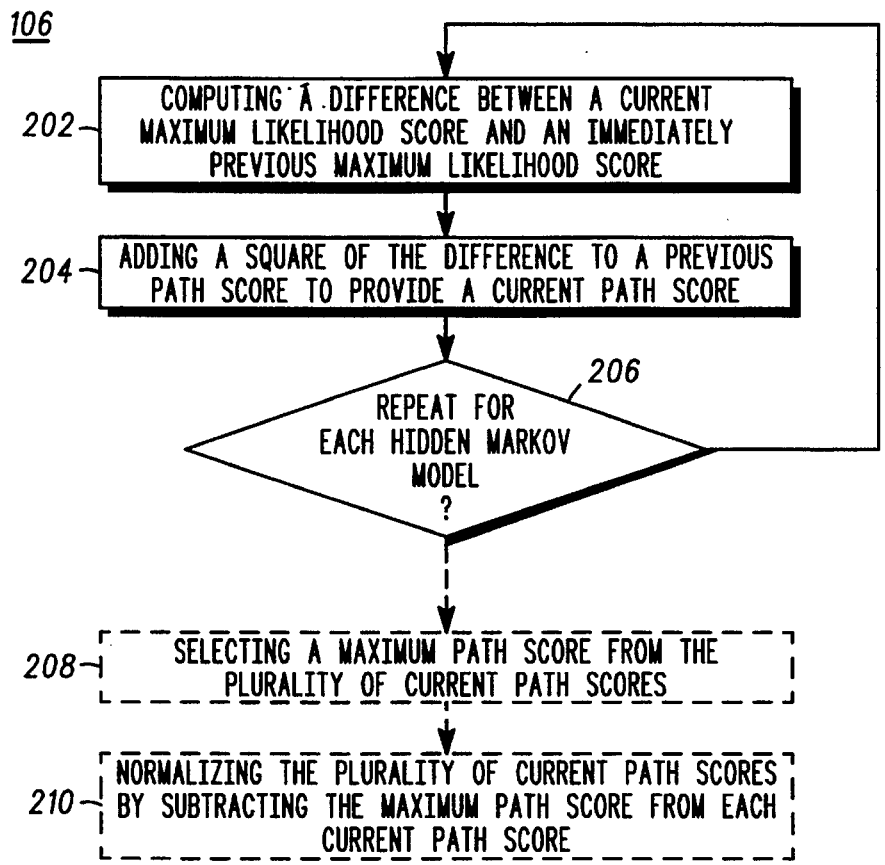
FIG. 2 is a flow diagram of one embodiment of steps for a method for computing a plurality of current path scores in accordance with the present invention.

FIG. 2, numeral 106, is a flow diagram of one embodiment of steps for a method for computing a plurality of current path scores in accordance with the present invention. First, a difference between a current maximum likelihood score and an immediately previous maximum likelihood score is computed (202). Second, a square of the difference is added to a previous path score to provide a current path score (204). The first (202) and second (204) steps are repeated for each Hidden Markov Model to provide a plurality of current path scores (206). When dynamic range is limited, normalization is required. After normalization, a minimum path score is selected from the plurality of current path scores (208), and the plurality of current path scores are normalized by subtracting the minimum or best path score from each current path score (210).

Figure 3:
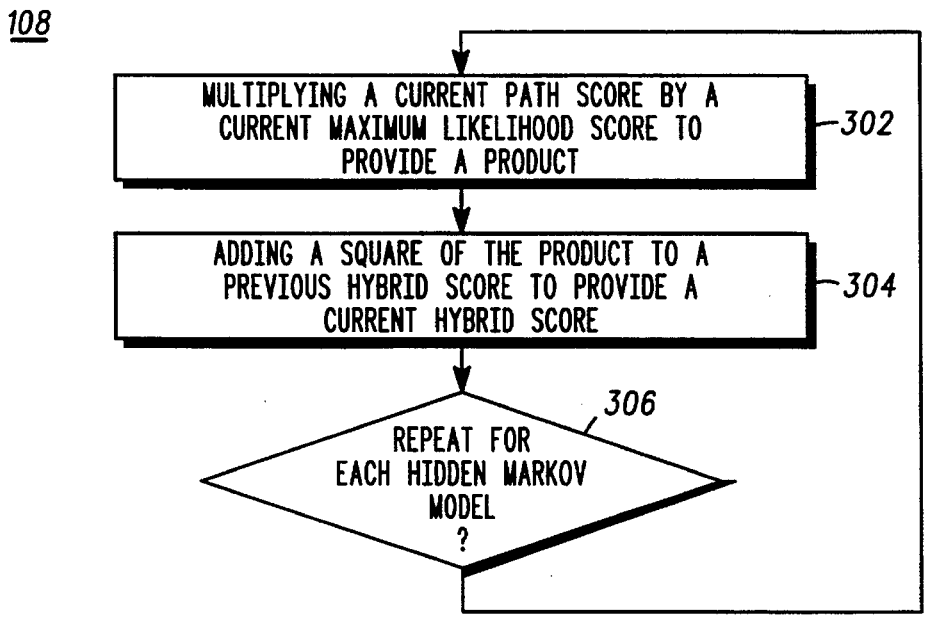
FIG. 3 is a flow diagram of one embodiment of steps for a method for computing a plurality of current hybrid scores in accordance with the present invention.

FIG. 3, numeral 108, is a flow diagram of one embodiment of steps for a method for computing a plurality of current hybrid scores in accordance with the present invention. First, a current path score is multiplied by a current maximum likelihood score to provide a product (302). Then, a square of the product is added to a previous hybrid score to provide a current hybrid score (304). Steps 302 and 304 are repeated for each Hidden Markov Model to provide a plurality of current hybrid scores.

Figure 4:
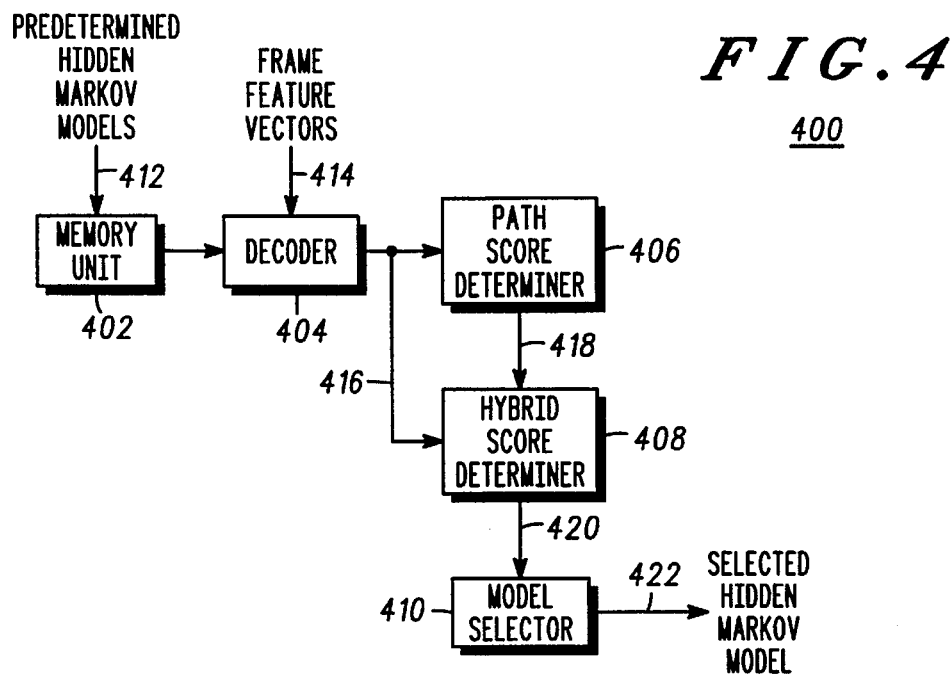
FIG. 4 is a block diagram of one embodiment of an apparatus for optimizing Hidden Markov Model speech recognition in accordance with the present invention.

FIG. 4, numeral 400, is a block diagram of one embodiment of an apparatus for optimizing Hidden Markov Model speech recognition in accordance with the present invention. The apparatus comprises a memory unit (402), a decoder (404), a path score determiner (406), a hybrid score determiner (408), and a model selector (410).

The memory unit (402) receives and stores a plurality of predetermined Hidden Markov Models (412). The decoder (404) receives a plurality of frame feature vectors (414) and determines, for each frame feature vector, a plurality of current maximum likelihood scores (416) each corresponding to a distinct Hidden Markov Model in the plurality of predetermined Hidden Markov models (412) stored in the memory unit (402). The path score determiner (406) receives the plurality of current maximum likelihood scores (416) from the decoder (404) and computes, for each frame feature vector, a plurality of current path scores (418) each corresponding to a distinct Hidden Markov Model in the plurality of predetermined Hidden Markov Models (412). A path score quantifies a variation in a maximum likelihood score as a function of time. The hybrid score determiner (408) receives the plurality of current path scores (418) from the path score determiner (406) and the plurality of current maximum likelihood scores (416) from the decoder (404). Then, the hybrid score determiner (408) computes, for each frame feature vector, a plurality of current hybrid scores (420) each corresponding to a distinct Hidden Markov Model in the plurality of predetermined Hidden Markov Models (412). Each hybrid score is a combination of the maximum likelihood score and the path score for a model. The model selector (410) selects a Hidden Markov Model corresponding to a lowest (best) current hybrid score in the plurality of current hybrid scores (420).

Figure 5:
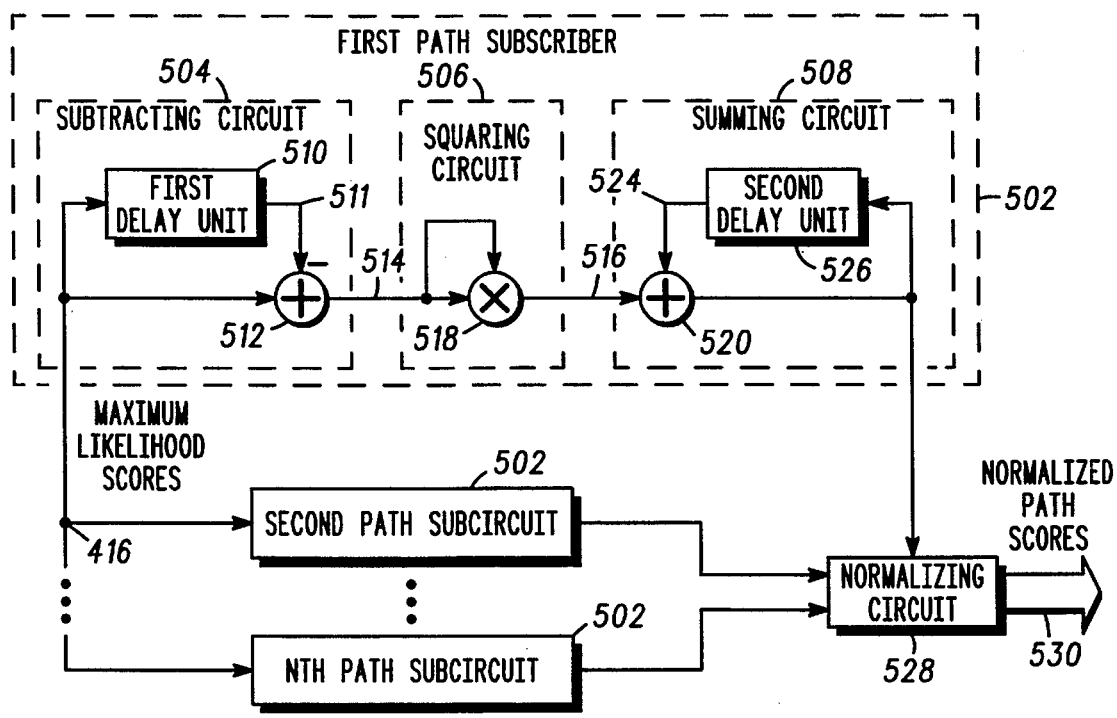
FIG. 5 is a block diagram of one embodiment of a path score determiner in an apparatus for optimizing Hidden Markov Model speech recognition in accordance with the present invention.

FIG. 5, numeral 406, is a block diagram of one embodiment of a path score determiner in an apparatus for optimizing Hidden Markov Model speech recognition in accordance with the present invention. The path score determiner (406) comprises a plurality of path subcircuits (502). Each path subcircuit comprises a subtracting circuit (504), a squaring circuit (506), a summing circuit (508), and a normalizing circuit (528).

The subtracting circuit (504) computes a difference (514) between a current maximum likelihood score (416) and an immediately previous maximum likelihood score (511). The subtracting circuit (504) may contain a first delay unit (510) for holding the current maximum likelihood score (416) to provide the immediately previous maximum likelihood score (511) to a subtractor (512) which computes the difference (514).

The squaring circuit (506) receives the difference (514) and provides a squared difference (516) by inputting the difference (514) to both inputs of a multiplier (518).

The summing circuit (508) receives the squared difference (516) and uses an adder (520) to add the squared difference (516) to a previous path score (524) to provide a current path score (522). The summing circuit (508) may contain a second delay unit (526) for holding the current path score (522) to provide the previous path score (524).

The normalizing circuit (528) provides a plurality of normalized path scores (530) by subtracting a minimum path score from each current path score (522).

Figure 6:
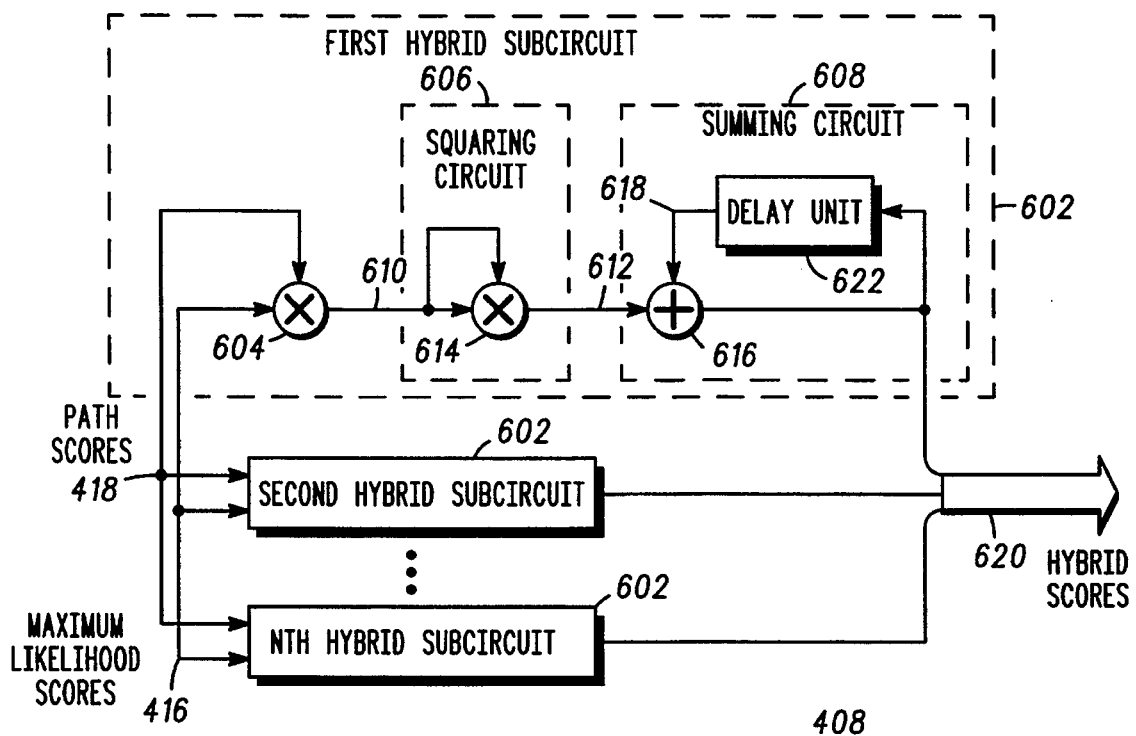
FIG. 6 is a block diagram of one embodiment of a hybrid score determiner in an apparatus for optimizing Hidden Markov Model speech recognition in accordance with the present invention.

FIG. 6, numeral 408, is a block diagram of one embodiment of a hybrid score determiner in an apparatus for optimizing Hidden Markov Model speech recognition in accordance with the present invention. The hybrid score determiner (408) comprises a plurality of hybrid subcircuits (602) one for each Hidden Markov Model. A hybrid subcircuit (602) comprises a multiplier (604), a squaring circuit (606), and a summing circuit (608).

The multiplier (604) multiplies a current path score (418) from the path score determiner (406) by a current maximum likelihood score (416) to provide a product (610).

The squaring circuit (606) receives the product (610) and provides a squared product (612) by inputting the product (610) to both inputs of a multiplier (614).

The summing circuit (608) receives the squared product (612) and uses an adder (616) to add the squared product (612) to a previous hybrid score (618) to provide a current hybrid score (620). The summing circuit (608) may contain a delay unit (622) for holding the current hybrid score (620) to provide the previous path score (618).

Figure 7:
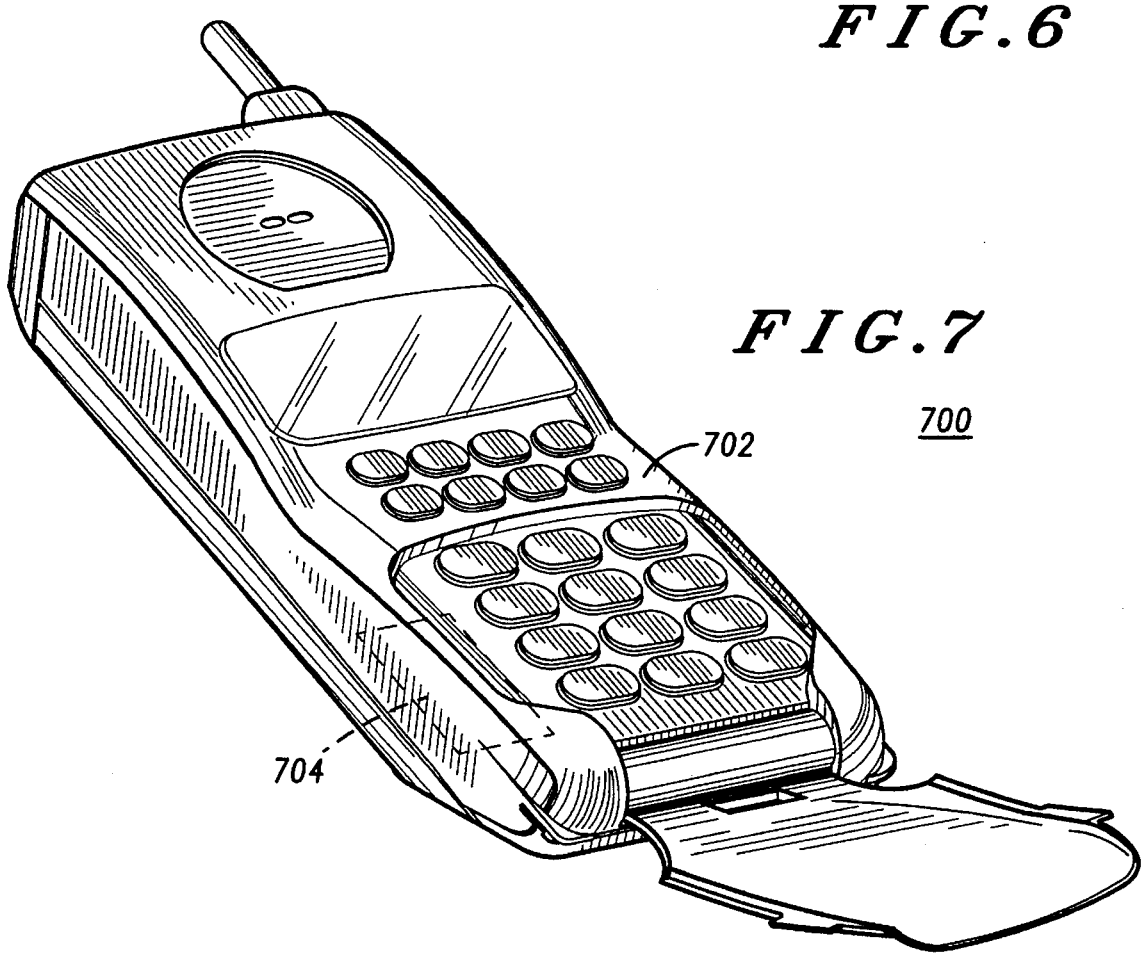
FIG. 7 is a depiction of one embodiment of a radio comprising an apparatus for optimizing Hidden Markov Model speech recognition in accordance with the present invention.

FIG. 7, numeral 700, is a depiction of one embodiment of a radio (702) comprising an apparatus (704) for optimizing Hidden Markov Model speech recognition in accordance with the present invention. The apparatus is depicted in FIG. 4.

Figure 8:
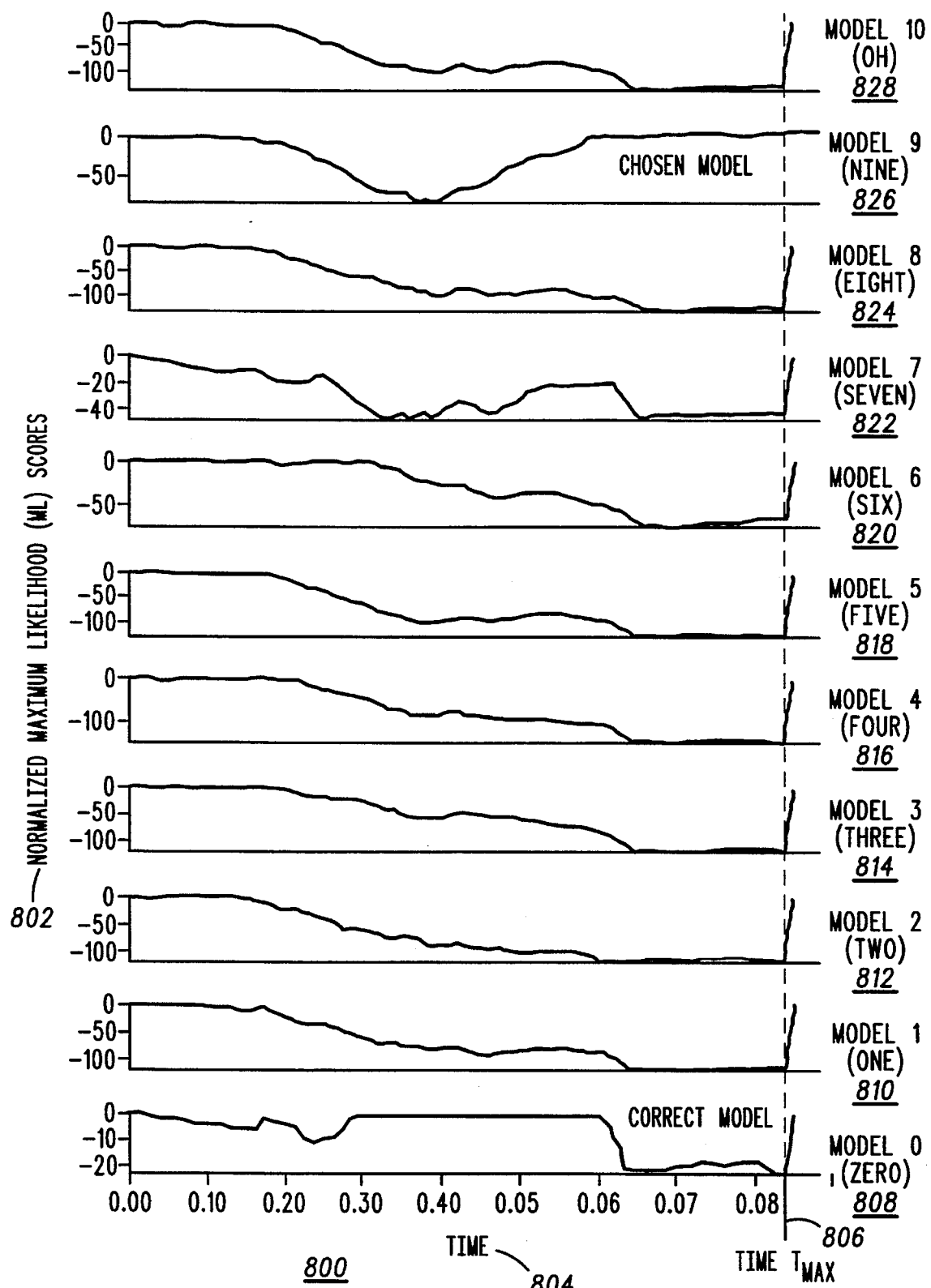
FIG. 8 is a graphical depiction of examples of normalized maximum likelihood scores for a set of HMM word models with respect to time.

FIG. 8, numeral 800, is a graphical depiction of examples of normalized maximum likelihood, ML, scores for a set of HMM word models with respect to time. The examples are graphs of normalized maximum likelihood scores (802) with respect to time (804) up to time Tmax (806). Tmax is the time of the last frame processed. The eleven graphs (808, 810, 812, 814, 816, 818, 820, 822, 824, 826, and 828) represent the eleven digit models "zero" through "nine" and "oh". The graphs illustrate the fact that choosing the model having the best ML score caused a misrecognition of the input word.

Figure 9:
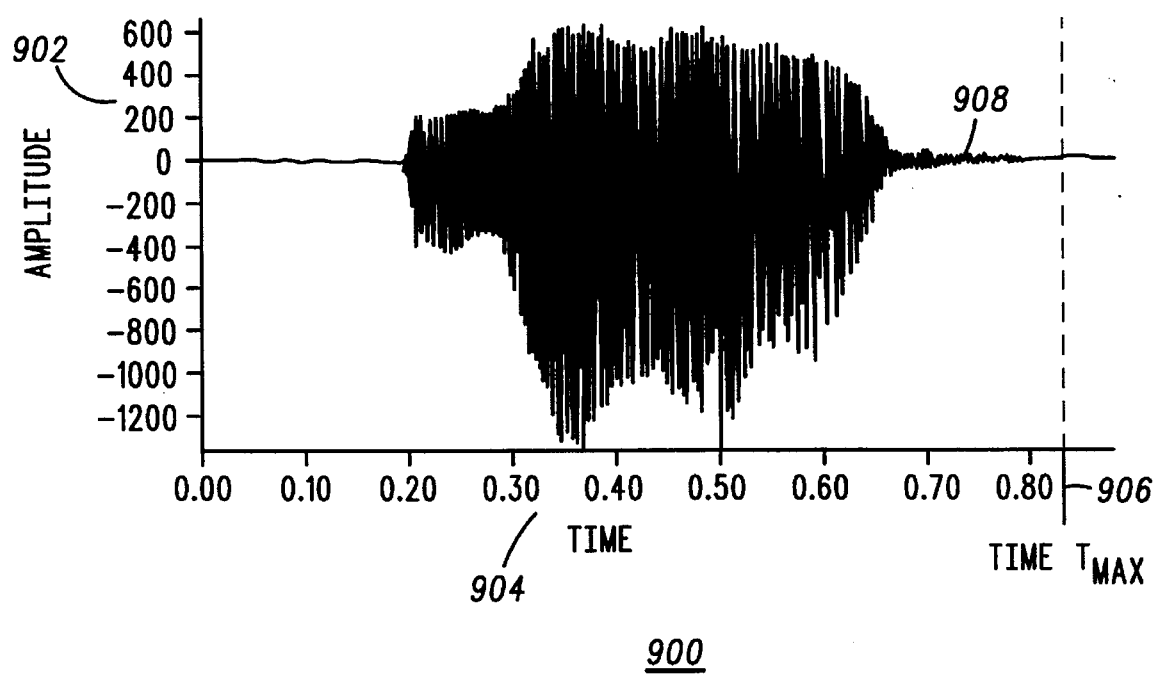
FIG. 9 is a graphical depiction of the amplitude waveform of an example voice signal with respect to time that relates to the score plots in FIG. 8.

FIG. 9, numeral 900, is a graphical depiction of the amplitude waveform of an example voice signal with respect to time which relates to the score plots in FIG. 8. This is the waveform for the word "zero" (808). The waveform (908) is plotted as amplitude (902) with respect to time (904) up to time Tmax (906).

Figure 10:
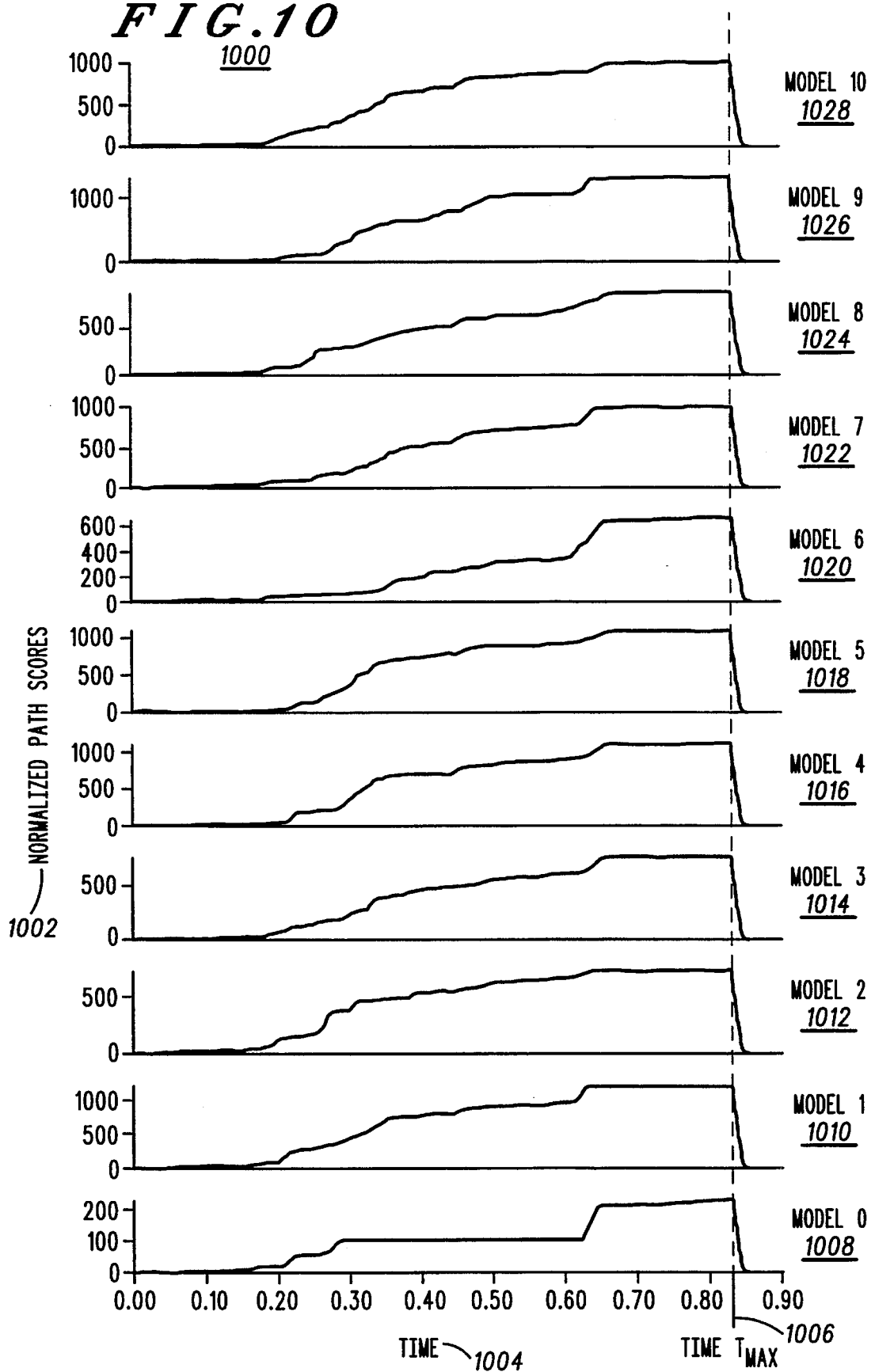
FIG. 10 is a graphical depiction of the PATH scores for the same set of HMM models as described in FIG. 8 with respect to time.

FIG. 10, numeral 1000, is a graphical depiction of the PATH scores for the same set of HMM models referred to in FIG. 8. The PATH scores are determined using Equation 3 which is set forth below. The graphs show normalized maximum likelihood scores (1002) with respect to time (1004) up to time Tmax (1006). The eleven graphs (1008, 1010, 1012, 1014, 1016, 1018, 1020, 1022, 1024, 1026, and 1028) represent the eleven digit models "zero" through "nine" and "oh".

Figure 11:
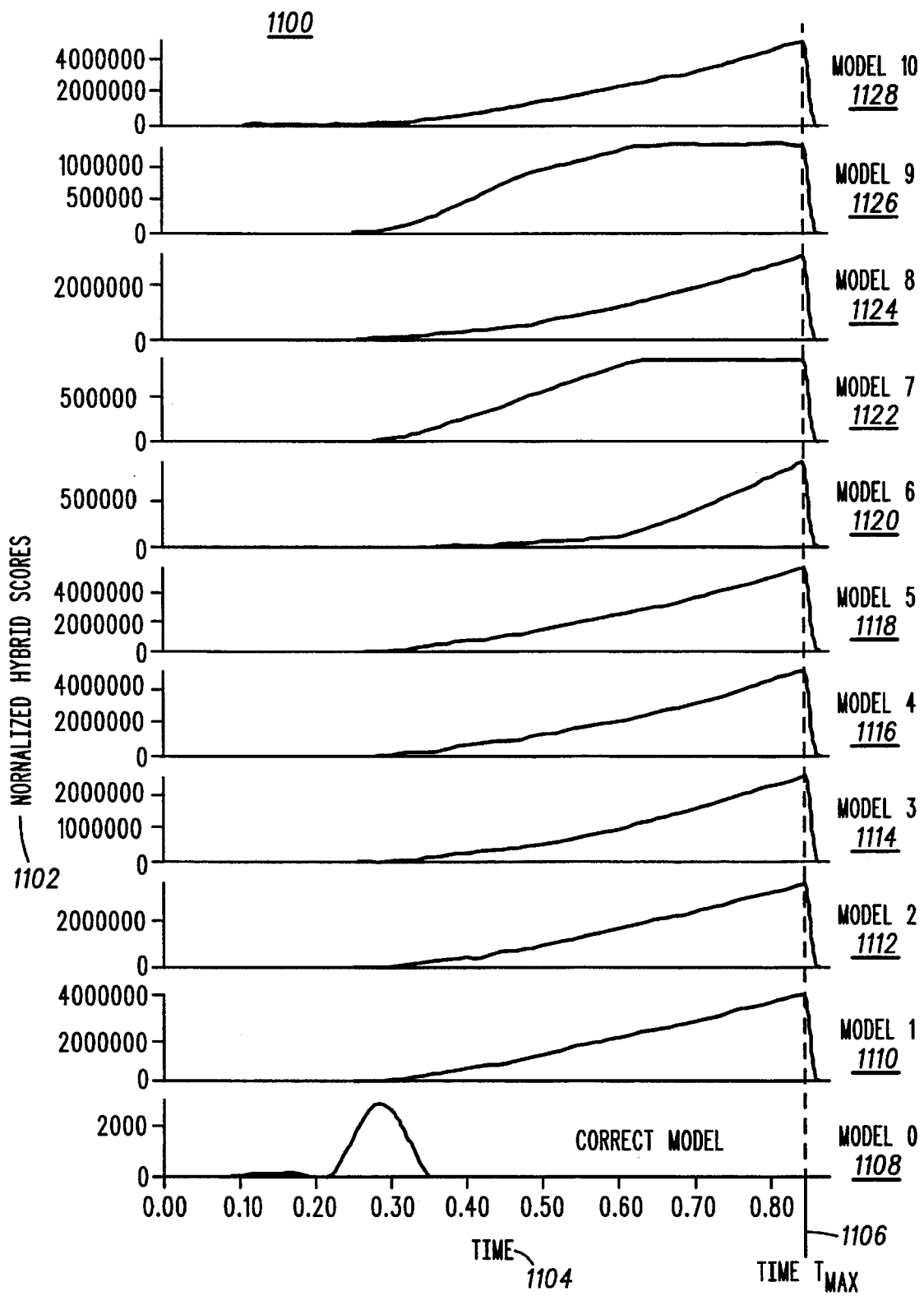
FIG. 11 is a graphical depiction of the ML-PATH scores for the same set of HMM models as described in FIG. 8 with respect to time.

FIG. 11, numeral 1100, is a graphical depiction of the ML-PATH scores for the same set of HMM models referred to in FIG. 8. The ML-PATH scores are determined using Equation 4 which is set forth below. The graphs show normalized maximum likelihood scores (1102) with respect to time (1104) up to time Tmax (1106). The eleven graphs (1108, 1110, 1112, 1114, 1116, 1118, 1120, 1122, 1124, 1126, and 1128) represent the eleven digit models "zero" through "nine" and "oh". FIG. 11 demonstrates that the ML-PATH metric can be used to identify the correct HMM model when the standard ML metric failed to do so.

Plots of the ML scores of HMM models versus time are referred to herein as "score paths" or "paths", examples of which are shown in FIG. 8. Choosing the model having the best ML score at a particular decision time does not guarantee correct correspondence with spoken input. The "score path" function, described by the ML score versus time plot of the "correct", i.e., corresponding to the spoken input, HMM model, usually exhibits less overall deviance from the "optimum" path than the score paths of the "incorrect" models. In FIG. 8 the "optimum" path is a straight horizontal line from observation time 0 to time Tmax (806), indicating that a given model was the best ML choice for every input observation. All other score paths are necessarily longer. Since the underlying model process that accounts for the acoustic observations cannot be deterministically specified, i.e., are "hidden", for real speech it is extremely unlikely that the "optimum" path is ever realized. However, the "correct" HMM model approximates the "optimum" score path more closely than all of the other models. Thus, the "correct" model is the ML choice for the majority of the input observations and has the shortest overall score path from time 0 to time Tmax (806). Here "shortest" refers to a function related to the actual length of the score path. Sequences of acoustic event observations which make the "correct" model less probable for short periods are not given undue weight in choosing the best model. The ML-PATH metric is a novel heuristic means of weighting the absolute HMM ML scores at some observation time t in such a way that the past overall behavior, i.e., "best average", of the ML scores have influence over the best model choice.

FIG. 8 displays the normalized maximum likelihood accumulated log probability scores as a function of time for each of 11 HMM digit models as determined by a typical HMM recognizer. The digit models are the words "zero" through "nine" and "oh". The ML scores were generated by a HMM word-based speech recognition system. Each Hidden Markov Model consists of a number of states. Each state may be represented by transition probabilities and a number of speech feature observation probabilities. In a typical recognizer these may be cepstral features, delta-cepstral features, and energy based features. The invention is not limited in usefulness by the particular features of the recognizer that employs it. The model probabilities are typically stored in logarithmic form. In a typical Viterbi type decoder, as new speech observation features are generated, the log probabilities of the observations and transitions are summed in such a manner as to maximize the total accumulated probability for each HMM. The accumulated log probabilities are normalized by the "best", i.e., most positive score, of any model at each time tick, typically a 10–20 msec. interval, so that the normalized "best" ML overall score at any time is 0.0, the maximum ordinate for the score plots in FIG. 8. Less probable model scores are negative. In the illustrative example shown in FIG. 8 the input word to the recognizer was "zero" whose time-aligned waveform is shown in FIG. 9. In this instance the recognizer selected the word "nine" instead of "zero" since the model for "nine" was the best ML choice at the last time tick, time Tmax on the diagram, based solely on the maximum likelihood criterion. This is indicated in the score path plots by the path for model 9 (826) having a log probability value of 0.0 at the last time tick, Tmax. However, the score path for Model 0 (808), the correct word model, shows that "zero" was the maximum likelihood choice for most of the waveform duration, deviating from "maximum likelihoodness" only at the end of the word. As previously mentioned, this problem arises due to the fact that in most HMM recognition systems, the models are trained and decoded to return the "best" state sequence given a set of input feature observations, not the best model. Because of noise, artifacts, or inadequate model parameter training, the maximum likelihood state sequence may not always correspond to the "correct" model, especially when the recognizer test environment is different from the training environment.

One quantitative manifestation of the "best average" ML score is the ML score path "length" from time 0 to time Tmax for each model. Again, "length" refers to a function of the ML score path values and is not necessarily a geometric distance. HMM models which on average are less likely in the ML sense will have "longer" paths than models which are more likely. In the ideal case, the shortest path is realized when the "correct" model is the maximum likelihood choice at every time tick. A measure of the score path "length", herein called the PATH score, is obtained by summing the differences of the maximum likelihood scores across each time period as expressed functionally in Equation 3.

$$l_t^k = \sum_{t=0}^{Tmax-1} (s_{t+1}^k - s_t^k)^n, \ k = 1, 2, \ldots, K_{models} \qquad (Eq. 3)$$

where $l_t^k$ is a best ML score path length measure for model k at time t, and $s_t^k$ is the best normalized log probability score of model k at time step t. In the preferred embodiment the score differences are squared, i.e., n=2, before summing. This has the effect of penalizing large differences more than small ones and has been shown empirically to produce better results. However, other path functions are possible, such as the absolute value of the ML score difference. Also, in the preferred embodiment, the PATH scores of all models are normalized by the best of the PATH scores at each instant in order to keep the numbers within the numerical range of the computing device and since only relative scores are necessary. An illustration of the PATH scores as calculated using Equation 3 is shown in FIG. 10. In this case, as opposed to the ML scores in FIG. 8, Model 0 (1008) has the lowest or best score at time Tmax (1006) and corresponds correctly to the spoken input word "zero".

There are numerous ways of combining the PATH and ML scores to form the ML-PATH hybrid metric invention described herein. In the preferred embodiment the ML-PATH metric is described in mathematical form by Equation 4.

$$k_{best} = MIN \left\{ \forall (k \in K_{models}) | \sum_{t=0}^{Tmax-1} (s_{t+1}^k \cdot l_t^k)^2 \right\} \qquad (Eq. 4)$$

where $k_{best}$ is the index of the model with the best ML-PATH score, $s_{t+1}^k$ is the best ML probability score for model k at time t, and $l_t^k$ is the relative score path "length", i.e., PATH score, of model k at time t, obtained in Equation 3. The recognition decision is thus made on the basis of a model's relative ML-PATH score, i.e., lowest score, rather than on the ML score alone. Note that there are other mathematical ways of combining the ML and PATH scores to form the ML-PATH metric. Some of these alternate methods may reduce the computations involved. For example, the $(s_{t+1}^k \cdot l_t^k)^2$ in Equation 4 can be replaced with the absolute value of the product, $|(s_{t+1}^k \cdot l_t^k)|$, with little effect on the performance of the metric. The ML-PATH scores for this example are shown in FIG. 11. Here again, Model 0 (1108) has the lowest or best score and is chosen as the model which best represents the spoken input word.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for optimizing Hidden Markov Model recognition of an input speech signal corresponding to a plurality of frame feature vectors, the method comprising:

1A) storing, in a memory unit, a plurality of predetermined Hidden Markov Models;

1B) determining, in a decoder for a frame feature vector, a plurality of current maximum likelihood scores each corresponding to a distinct Hidden Markov Model in the plurality of predetermined Hidden Markov Models;

1C) computing, in a decoder for the frame feature vector, a plurality of current path scores each corresponding to the distinct Hidden Markov Model in the plurality of predetermined Hidden Markov Models, wherein each path score quantifies a variation in the maximum likelihood score as a function of time, and for the distinct Hidden Markov Model:

1C1) computing a difference between the current maximum likelihood score and an immediately previous maximum likelihood score;

1C2) adding a square of the difference to a previous path score to provide the current path score; and 1C3) repeating steps 1C1 and 1C2 for each Hidden Markov Model to provide the plurality of current path scores;

1D) computing, in a decoder for the frame feature vector, a plurality of current hybrid scores each corresponding to the distinct Hidden Markov Model in the plurality of predetermined Hidden Markov Models, wherein each hybrid score is a combination of the maximum likelihood score and the path score;

1E) repeating steps 1B through 1D until all frame feature vectors have been processed; and 1F) selecting the Hidden Markov Model with a lowest current hybrid score.

2. The method of claim 1, wherein the plurality of current maximum likelihood scores are determined by a Viterbi decoder.

3. The method of claim 1, wherein the method further comprises:

4A) selecting a minimum path score from the plurality of current path scores; and 4B) normalizing the plurality of current path scores by subtracting the minimum path score from each current path score.

4. The method of claim 1, wherein step 1D further comprises:

for the Hidden Markov Model:

5A) multiplying each current path score by the current maximum likelihood score to provide a product;

5B) adding a square of the product to a previous hybrid score to provide the current hybrid score; and 5C) repeating steps 5A and 5B for each Hidden Markov Model to provide a plurality of current hybrid scores.

5. An apparatus for optimizing Hidden Markov Model recognition of an input speech signal corresponding to a plurality of frame feature vectors, the apparatus comprising:

A) a memory unit, operably coupled to receive a plurality of predetermined Hidden Markov Models;

B) a decoder, operably coupled to receive the plurality of frame feature vectors and operably coupled to the memory unit, for determining, for each frame feature vector, a plurality of current maximum likelihood scores each corresponding to a distinct Hidden Markov Model in the plurality of predetermined Hidden Markov Models;

C) a path score determiner, operably coupled to the decoder, for computing, for each frame feature vector, a plurality of current path scores each corresponding to the distinct Hidden Markov Model in the plurality of predetermined Hidden Markov Models, wherein each path score quantifies a variation in the maximum likelihood score as a function of time, and wherein the path score determiner comprises a plurality of path subcircuits one for each Hidden Markov Model, wherein each path subcircuit comprises:
- C1) a subtracting circuit, operably coupled to the decoder, for computing a difference between the current maximum likelihood score and an immediately, previous maximum likelihood score;
- C2) a squaring circuit, operably coupled to the subtracting circuit, for providing a squared difference; and
- C3) a summing circuit, operably coupled to the squaring circuit, for adding the squared difference to a previous path score to provide the current path score;

D) a hybrid score determiner, operably coupled to the path score determiner and the decoder, for computing, for each frame feature vector, a plurality of current hybrid scores each corresponding to the distinct Hidden Markov Model in the plurality of predetermined Hidden Markov Models, wherein each hybrid score is a combination of the maximum likelihood score and the path score for the Hidden Markov Model;

E) a model selector, operably coupled to the hybrid score determiner, for selecting the Hidden Markov Model for the plurality of frame feature vectors with a lowest current hybrid score.

6. The apparatus of claim 5, wherein the decoder is a Viterbi decoder.

7. The apparatus of claim 5, wherein the apparatus further comprises a normalizing circuit, operably coupled to the plurality of path subcircuits, for normalizing the plurality of current path scores by subtracting a minimum path score from each current path score.

8. The apparatus of claim 5, wherein the hybrid score determiner comprises a plurality of hybrid subcircuits one for each Hidden Markov Model, wherein a hybrid subcircuit comprises:
- A) a multiplier, operably coupled to the decoder and path score determiner, for multiplying the current path score by the current maximum likelihood score to provide a product; and
- B) a squaring circuit, operably coupled to the multiplier, for providing a squared product; and
- C) a summing circuit, operably coupled to the squaring circuit, for adding the squared product to a previous hybrid score to provide the current hybrid score.

9. A radio comprising an apparatus for optimizing Hidden Markov Model recognition of an input speech signal corresponding to a plurality of frame feature vectors, the apparatus comprising:
- A) a memory unit, operably coupled to receive a plurality of predetermined Hidden Markov Models;
- B) a decoder, operably coupled to receive the plurality of frame feature vectors and operably coupled to the memory unit, for determining, for each frame feature vector, a plurality of current maximum likelihood scores each corresponding to a distinct Hidden Markov Model in the plurality of predetermined Hidden Markov Models;
- C) a path score determiner, operably coupled to the decoder, for computing, for each frame feature vector, a plurality of current path scores each corresponding to the distinct Hidden Markov Model in the plurality of predetermined Hidden Markov Models, wherein each path score quantifies a variation in the maximum likelihood score as a function of time, and wherein the path score determiner comprises a plurality of path subcircuits one for each Hidden Markov Model, wherein each path subcircuit comprises:
- C1) a subtracting circuit, operably coupled to the decoder, for computing a difference between the current maximum likelihood score and an immediately previous maximum likelihood score;
- C2) a squaring circuit, operably coupled to the subtracting circuit, for providing a squared difference; and
- C3) a summing circuit, operably coupled to the squaring circuit, for adding the squared difference to a previous path score to provide the current path score;

D) a hybrid score determiner, operably coupled to the path score determiner, for computing, for each frame feature vector, a plurality of current hybrid scores each corresponding to the distinct Hidden Markov Model in the plurality of predetermined Hidden Markov Models, wherein each hybrid score is a combination of the maximum likelihood score and the path score for the Hidden Markov Model;

E) a model selector, operably coupled to the hybrid score determiner, for selecting the Hidden Markov Model for the plurality of frame feature vectors with a lowest current hybrid score.

* * * * *